(12) United States Patent
Yagi (10) Patent No.: US 11,447,139 B2
(45) Date of Patent: Sep. 20, 2022

(54) DRIVING ASSISTANCE APPARATUS

(71) Applicant: Panasonic Intellectual Property Management Co., Ltd., Osaka (JP)

(72) Inventor: Mikio Yagi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 73 days.

(21) Appl. No.: 17/115,182

(22) Filed: Dec. 8, 2020

(65) Prior Publication Data

US 2021/0188288 A1  Jun. 24, 2021

(30) Foreign Application Priority Data

Dec. 20, 2019 (JP) .............................. JP2019-230726
Jun. 26, 2020 (JP) .............................. JP2020-110531

(51) Int. Cl.
*B60W 40/08* (2012.01)
*B60W 50/14* (2020.01)
*B60Q 1/14* (2006.01)
*B60K 35/00* (2006.01)
*B60J 3/04* (2006.01)
(Continued)

(52) U.S. Cl.
CPC ............. *B60W 40/08* (2013.01); *B60J 3/04* (2013.01); *B60K 35/00* (2013.01); *B60Q 1/1423* (2013.01); *B60W 10/20* (2013.01); *B60W 10/30* (2013.01); *B60W 50/14* (2013.01); *B60K 2370/143* (2019.05); *B60K 2370/146* (2019.05); *B60K 2370/152* (2019.05); *B60K 2370/177* (2019.05); *B60W 2040/0818* (2013.01); *B60W 2540/229* (2020.02)

(58) Field of Classification Search
CPC ...... B60W 40/08; B60W 10/20; B60W 10/30; B60W 50/14; B60W 2540/229; B60W 2040/0818; B60J 3/04; B60K 35/00; B60K 2370/177; B60K 2370/143; B60K 2370/152; B60K 2370/146; B60Q 1/1423
See application file for complete search history.

(56) References Cited

U.S. PATENT DOCUMENTS

2005/0021204 A1  1/2005  Kudo
2017/0313313 A1  11/2017  Asakura

FOREIGN PATENT DOCUMENTS

EP       3730331 A1 * 10/2020  ............ B60W 40/08
JP       2005-041308       2/2005
JP       2007-168720       7/2007
(Continued)

OTHER PUBLICATIONS

Office Action from Japan Patent Office (JPO) in Japanese Patent Appl. No. 2020-110531, dated Jun. 22, 2021, together with an English language translation.

*Primary Examiner* — Michael D Lang
(74) *Attorney, Agent, or Firm* — Greenblum & Bernstein, P.L.C.

(57) ABSTRACT

A driving assistance apparatus includes: a driving assister that assists driving by a driver of a vehicle, by way of driving assistance functions; and a controller that obtains inattentive state information indicating an inattentive state of the driver, and reduces or deactivates at least one driving assistance function among the driving assistance functions, by controlling the driving assister based on the inattentive state information obtained.

13 Claims, 5 Drawing Sheets

(51) Int. Cl.
 *B60W 10/20* (2006.01)
 *B60W 10/30* (2006.01)

(56) References Cited

FOREIGN PATENT DOCUMENTS

| JP | 2010-069983 | 4/2010 |
| JP | 2017-197150 | 11/2017 |
| JP | 2017-199212 | 11/2017 |
| JP | 2019-137175 | 8/2019 |

* cited by examiner

DRIVING ASSISTANCE APPARATUS

CROSS REFERENCE TO RELATED APPLICATIONS

The present application is based on and claims priority of Japanese Patent Application No. 2019-230726 filed on Dec. 20, 2019 and Japanese Patent Application No. 2020-110531 filed on Jun. 26, 2020.

FIELD

The present disclosure relates to a driving assistance apparatus that assists a driver driving a vehicle, for example.

BACKGROUND

Conventionally, there is disclosed a driving assistance apparatus that includes a state determining unit that determines a driver's state with regard to attentiveness of a driver of a vehicle, and a changing unit that changes at least one of a color, an emission distance, or an emission width of light of a headlamp of the vehicle according to the determined driver's state (see Patent Literature (PTL) 1).

CITATION LIST

Patent Literature

PTL 1: Japanese Unexamined Patent Application Publication No. 2017-199212

SUMMARY

However, the driving assistance apparatus according to aforementioned PTL 1 can be improved upon.

In view of this, a driving assistance apparatus according to the present disclosure is capable of improving upon the above related art.

A driving assistance apparatus according to an aspect of the present disclosure includes: a driving assister that assists driving by a driver of a vehicle, by way of driving assistance functions; and a controller that obtains inattentive state information indicating an inattentive state of the driver, and reduces or deactivates at least one driving assistance function among the driving assistance functions, by controlling the driving assister based on the inattentive state information obtained.

It should be noted that some specific aspects of the above may be implemented using a system, a method, an integrated circuit, a computer program, or a computer-readable recording medium such as a CD-ROM, or may be implemented using any combination of a system, a method, an integrated circuit, a computer program, and a recording medium.

A driving assistance apparatus according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

In recent years, various measures have been proposed for reducing traffic accidents. One of those measures seeks to reduce traffic accidents by reducing inattentiveness of a driver. In view of this, the inventors have focused on the relationship between the driving skill of a driver driving a vehicle and driving difficulty, using flow theory, in order to reduce the inattentiveness of the driver. According to the flow theory, when the relationship between driving skill and driving difficulty is a match between high driving skill and high driving difficulty, the driver may be in an attentive state in which the driver can concentrate. Furthermore, if the driving difficulty is higher than the driving skill, the driver may think that driving is too difficult and become panicked. In addition, if the driving skill is higher than the driving difficulty, the driver may think that driving is too easy and become bored, and thus may become inattentive because driving does not pose a challenge (i.e., driving is too easy). It should be noted that in the subsequent description, the inattentive state is defined as a state of inattentiveness due to driving being too easy.

Since driving assistance functions (referred to as advanced driver-assistance systems (ADAS) for example) are provided in the vehicle, even when the driving skill of the driver is low, the driving skill is supplemented by the driving assistance functions. For this reason, the driver does not easily become panicked. However, in the case where the driving skill is higher than the driving difficulty, the driving skill is further supplemented by the driving assistance functions, and thus the driver is prone to becoming inattentive.

In view of this, aforementioned PTL 1 discloses that, in the driving assistance apparatus, the inattentive state of the driver is ameliorated by changing at least one of the color, emission distance, or emission width of the light of the headlamp. However, during daytime in which the headlamp is not turned on, it is difficult to ameliorate the inattentive state of the driver. Furthermore, even if, aside from the color of the light of the headlight, the emission distance and emission width are also changed when the driver is driving indifferently (in a dazed manner), there are cases where the driver gets accustomed to the change, and thus the inattentive state cannot be ameliorated.

In view of this, a driving assistance apparatus according to an aspect of the present disclosure includes: a driving assister that assists driving by a driver of a vehicle, by way of driving assistance functions; and a controller that obtains inattentive state information indicating an inattentive state of the driver, and reduces or deactivates at least one driving assistance function among the driving assistance functions, by controlling the driving assister based on the inattentive state information obtained.

Accordingly, if the driver of the vehicle falls into the inattentive state, the controller can control the driving assister to cause the driving assister to reduce or deactivate at least part of the driving assistance functions. As such, the driving assistance apparatus can prevent the state in which the driving skill of the driver is higher than the driving difficulty. Furthermore, the driving assistance apparatus can make the driver aware of his/her inattentive state by causing a change in the driving assistance functions. As such, the driving assistance apparatus can influence the consciousness of the driver so that the driver drives attentively.

Therefore, the driving assistance apparatus can ameliorate the inattentive state of the driver.

Furthermore, a driving assistance apparatus according to another aspect of the present disclosure further includes an attentiveness state detector that detects the inattentive state of the driver, and outputs the inattentive state information indicating the inattentive state detected, and the attentiveness state detector distinguishes between an attentive state in which the driver is paying attention and the inattentive state in which the driver is not paying attention.

Accordingly, it is possible to determine whether the driver is in the attentive state or the inattentive state. Since the driver can be assisted using the driving assistance functions if the driver is in the attentive state, it is possible to ensure safety during traveling of the vehicle. Furthermore, if the driver is in the inattentive state, the driving assister reduces or deactivates at least part of the driving assistance functions, and thus it is possible to influence the consciousness of the driver so that the driver drives attentively as described above.

Furthermore, in a driving assistance apparatus according to another aspect of the present disclosure, the attentiveness state detector detects, as the inattentive state, a state in which a degree of awareness of the driver is less than or equal to a specified value or a state in which the driver is not paying attention to a front of the vehicle.

Accordingly, since the inattentive state of the driver can be detected, the state of the driver with regard to attentiveness can be improved.

Furthermore, in a driving assistance apparatus according to another aspect of the present disclosure, when the controller obtains the inattentive state information, the driving assister deactivates augmented reality (AR) display by an AR display device of the vehicle.

Accordingly, deactivating the augmented reality display by the AR display device causes the driver to pay attention to the front. As such, the driving assistance apparatus can influence the consciousness of the driver so that the driver drives attentively as described above.

Furthermore, in a driving assistance apparatus according to another aspect of the present disclosure, when the controller obtains the inattentive state information, the driving assister reduces brightness of light being emitted by a headlamp of the vehicle.

Accordingly, reducing the brightness of the light being emitted by the headlamps causes the driver to pay attention to the front. As such, the driving assistance apparatus can influence the consciousness of the driver so that the driver drives attentively as described above.

Furthermore, in a driving assistance apparatus according to another aspect of the present disclosure, when the controller obtains the inattentive state information, the driving assister deactivates an automatic anti-glare function of an anti-glare mirror of the vehicle.

Accordingly, by deactivating the automatic anti-glare function of the anti-glare mirror, the anti-glare mirror will be glaring to be driver. As such, the driving assistance apparatus can influence the consciousness of the driver so that the driver drives attentively as described above.

Furthermore, in a driving assistance apparatus according to another aspect of the present disclosure, when the controller obtains the inattentive state information, the driving assister deactivates display of information related to driving assistance displayed on a side mirror of the vehicle.

Accordingly, deactivating the display of information related to driving assistance that is displayed on the side mirrors causes the driver to pay attention to the surroundings of the vehicle. As such, the driving assistance apparatus can influence the consciousness of the driver so that the driver drives attentively as described above.

Furthermore, in a driving assistance apparatus according to another aspect of the present disclosure, when the controller obtains the inattentive state information, the driving assister reduces an amount of power assist or deactivates the power assist provided by a power steering of the vehicle.

Accordingly, reducing the amount of power assist or deactivating the power assist provided by the power steering causes the driver to operate the handle while paying attention to the surroundings of the vehicle. As such, the driving assistance apparatus can influence the consciousness of the driver so that the driver drives attentively as described above.

Furthermore, a driving assistance apparatus according to another aspect of the present disclosure further includes a presenter that presents the at least one driving assistance function that has been reduced or deactivated by the driving assister.

Accordingly, since the driving assister presents the reduced or deactivated driving assistance function, the driver can be made aware of his/her inattentive state. As such, the driving assistance apparatus can influence the consciousness of the driver so that the driver drives attentively. As such, the driver can take a response such as restoring the driving assistance function.

Furthermore, in a driving assistance apparatus according to another aspect of the present disclosure, when the controller obtains a restoration signal input through operation of an operation input interface by the driver, for restoring the at least one driving assistance function that has been reduced or deactivated, the controller restores the at least one driving assistance function that has been reduced or deactivated.

Accordingly, since the driver can become aware of his/her inattentive state, the driver operates the operation input interface to restore the reduced or deactivated driving assistance function. As such, the driver can strive to stay in the attentive state so as not to be troubled by having to operate the operation input interface.

Furthermore, in a driving assistance apparatus according to another aspect of the present disclosure, the operation input interface includes an operation switch provided in a vicinity of a meter of the vehicle or at an upper portion of a center console of the vehicle.

Accordingly, since the operation switch for restoring the driving assistance functions is disposed at a position that prompts the driver to pay attention to the front, the driver can pay attention to the front while operating the operation input interface. With the driving assistance apparatus, the driver's state of attention in the forward direction can be improved.

Furthermore, in a driving assistance apparatus according to another aspect of the present disclosure, the operation switch is any one of a pull switch, a toggle switch, and a touch switch that receives touch-gesture input.

Accordingly, the driver needs to perform a pulling operation, a vertical motion operation, or a touch-gesture input operation on the operation switch in order to restore the driving assistance function. Since such an operation switch is configured so that operation by the driver requires attentiveness, it is possible to return the driver's attention to driving.

Furthermore, in a driving assistance apparatus according to another aspect of the present disclosure, the operation switch includes a cover that covers an operation portion of the operation switch.

Accordingly, the driver cannot perform switch operation on the operation switch in order to restore the driving assistance functions without first opening the cover. As such, with this configuration, operation by the driver also requires attentiveness, and thus it is possible to return the driver's attention to driving.

Furthermore, a driving assistance apparatus according to another aspect of the present disclosure, the attentiveness state detector detects the attentive state of the driver, and the controller restores the at least one driving assistance function that has been reduced or deactivated, by controlling the driving assister based on attentive state information obtained from the attentiveness state detector and indicating the attentive state of the driver.

Accordingly, when the driver returns from the inattentive state to the attentive state, the controller can restore the reduced or deactivated driving assistance function by controlling the driving assister. Accordingly, since the reduced or deactivated driving assistance function is restored, the driver can drive the vehicle more safely.

It should be noted that some specific aspects of the above may be implemented using a system, a method, an integrated circuit, a computer program, or a computer-readable recording medium such as a CD-ROM, or may be implemented using any combination of a system, a method, an integrated circuit, a computer program, and a recording medium.

Each of the subsequently-described exemplary embodiments shows a specific example of the present disclosure. The numerical values, shapes, materials, structural components, the arrangement and connection of the structural components, etc., shown in the following exemplary embodiments are mere examples, and are not intended to limit the scope of the present disclosure. Furthermore, among the structural components in the following exemplary embodiments, components not recited in any one of the independent claims are described as arbitrary structural components. Furthermore, in all of the exemplary embodiments, respective elements can be combined.

Hereinafter, a driving assistance apparatus according to an aspect of the present disclosure will be specifically described with reference to the Drawings.

Embodiment (Configuration: Driving Assistance Apparatus 1)

Figure 1:
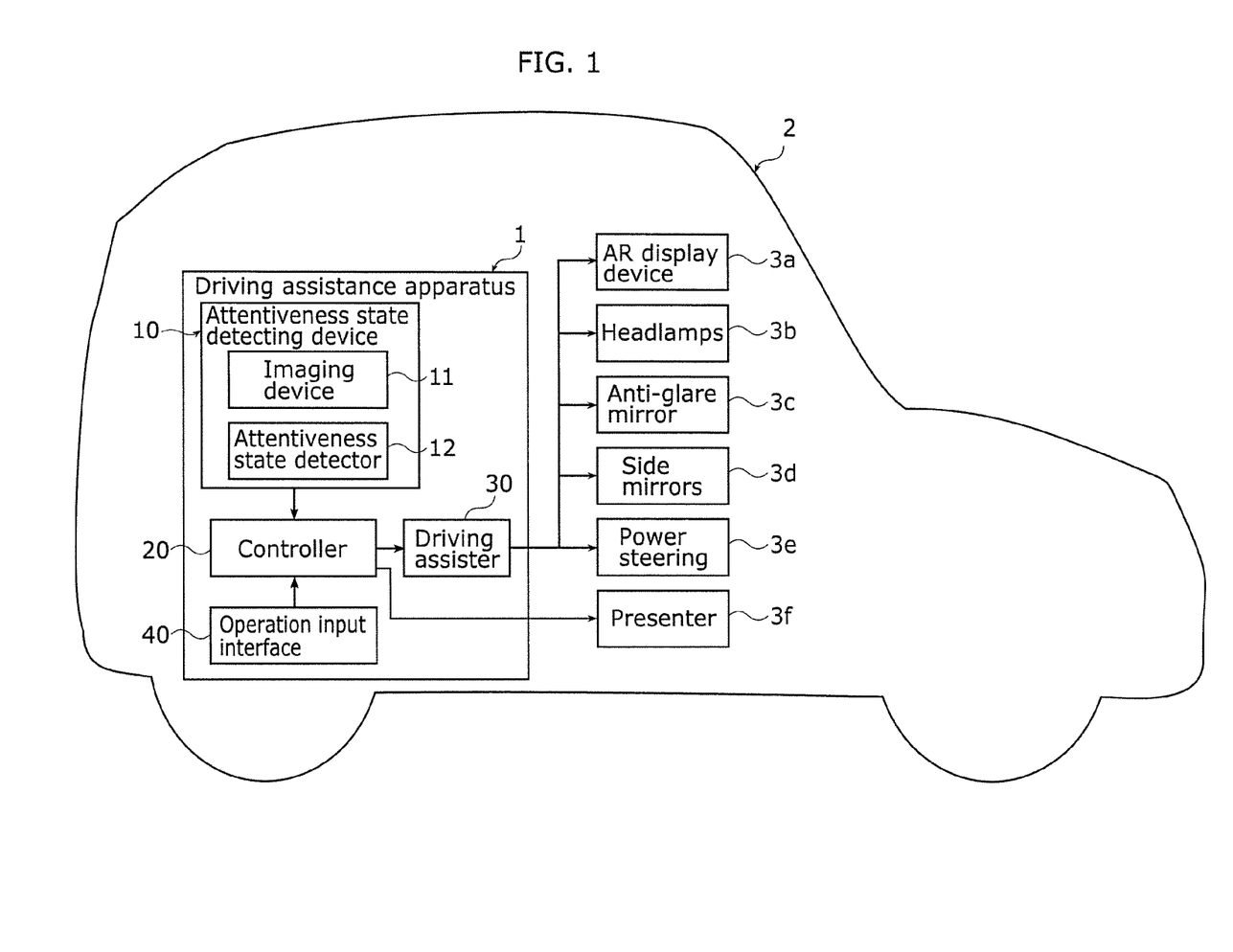
FIG. 1 is a block diagram illustrating a driving assistance apparatus according to an embodiment.
Figure 2:
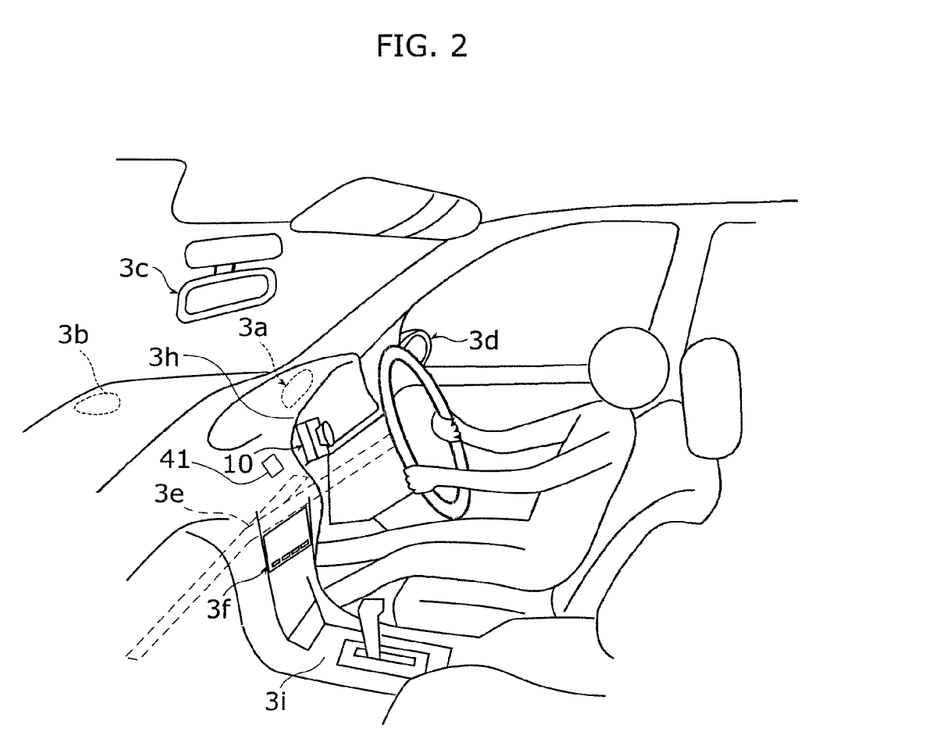
FIG. 2 is a schematic diagram illustrating an augmented reality (AR) display device, a headlamp, an anti-glare mirror, a side mirror, power steering, a presenter, and so on, disposed in a vehicle.

FIG. 1 is a block diagram illustrating driving assistance apparatus 1 according to an exemplary embodiment. FIG. 2 is a schematic diagram illustrating augmented reality (AR) display device 3a, headlamps 3b, anti-glare mirror 3c, side mirrors 3d, power steering 3e, presenter 3f, and so on, disposed in vehicle 2.

As illustrated in FIG. 1 and FIG. 2, driving assistance apparatus 1 is provided in vehicle 2, and assists the driving by the driver of vehicle 2. Driving assistance apparatus 1 varies driving assistance functions which assist the driving of the driver, based on the state of the driver driving vehicle 2. For example, driving assistance apparatus 1 reduces or deactivates a driving assistance function, and restores the reduced or deactivated driving assistance function.

Vehicle 2 is for example a car, a bike, or the like, which can be manually driven. AR display 3a, headlamps 3b, anti-glare mirror 3c, side mirrors 3d, power steering 3e, and presenter 3f are provided in vehicle 2.

AR display device 3a is an AR head-up display housed in a housing space inside the instrument panel. AR display device 3a includes a projector which projects an image on a display portion to thereby display the image superimposed on the actual view that can be seen through the windshield. In this embodiment, AR display device 3a is of the windshield type, and the display portion is the windshield. AR display device 3a performs augmented reality display for assisting driving, by superimposing navigation information such as a destination of the driver and the speed display of vehicle 2, alert information when another moving body is detected, and so on, on the actual view.

Headlamps 3b are provided at the front portion of vehicle 2, and emit visible light toward the front of vehicle 2. For example, in each of headlamps 3b, a plurality of LED modules are arranged in the vehicle width direction or the vertical direction of vehicle 2. Each LED module is one set of light-emitting diodes (LEDs) in three colors, red, green, and blue. Furthermore, the angle of the optical axis of each headlamp 3b in the vertical direction of vehicle 2 can be changed using an actuator, for example.

Anti-glare mirror 3c is disposed inside the cabin of vehicle 2, between the windshield and the driver's seat of vehicle 2. Anti-glare mirror 3c has an automatic glare-reducing function. Anti-glare mirror 3c automatically adjusts the optical reflectance of its mirror portion based on the brightness of the light entering the mirror portion which is detected by a sensor, for example.

Furthermore, anti-glare mirror 3c may be an electronic mirror including an image sensor for displaying a captured image on a display portion thereof. In this case, the image sensor, for example, brightly displays the area behind vehicle 2 or, in the case of rainy weather, displays video with the rain deleted, by performing image processing on the captured image.

Side mirrors 3d are disposed in the vicinity of the front doors on both sides of vehicle 2 so that the driver can check the back. Each of side mirrors 3d includes an approach display light capable of displaying the presence of another moving body approaching vehicle 2. When a sensor provided in vehicle 2 detects another moving body approaching vehicle 2, the approach indicator light of side mirror 3d displays information related to driving assistance, by lighting up. The information related to driving assistance is a display indicating the presence of another moving body approaching vehicle 2 from behind.

Power steering 3e controls the amount of power assist for easy steering wheel operation (i.e., easy steering) by the driver. For example, in the case where power steering 3e is an electric power steering, steering torque is detected by a torque sensor, and power steering 3e controls the amount of power assist provided by an electric motor. It should be noted that power steering 3e may be a hydraulic power steering.

Presenter 3f is a display of an onboard information terminal such as a car navigation system, an onboard display provided inside the meter panel of meter 3h, or the like. Presenter 3f may be a touch display including a liquid-crystal panel, an organic electroluminescent (EL) panel, or the like.

When presenter 3f obtains information indicating a reduced or deactivated driving assistance function from controller 20 to be described later, presenter 3f presents the information indicating the reduced or deactivated driving assistance function to the driver (i.e., passengers of the vehicle). Furthermore, when presenter 3f obtains information indicating restored driving assistance function from controller 20, presenter 3f presents the information indicating the restored driving assistance function to the driver.

Driving assistance apparatus 1 includes attentiveness state detecting device 10, controller 20, driving assister 30, and operation input interface 40.

[Attentiveness State Detecting Device 10]

Attentiveness state detecting device 10 includes imaging device 11 such as a near-infrared camera, or the like, and attentiveness state detector 12 that detects an inattentive state of the driver based on images captured by imaging device 11.

In attentiveness state detecting device 10, imaging device 11 is for example disposed on a top surface portion of the instrument panel so as to be oriented facing the driver's seat of vehicle 2. Attentiveness state detecting device 10 captures images of the head of the driver which is irradiated with near-infrared light, by way of imaging device 11. Specifically, attentiveness state detecting device 10 captures images of the face of the driver sitting on the driver's seat.

Image analysis is for example performed by attentiveness state detector 12 on the images captured by imaging device 11. Specifically, attentiveness state detector 12 detects the contour and parts, such as the eyes, ears, nose, mouth, and so on, of the face of the driver that have been captured. Attentiveness state detector 12 detects the orientation of the face of the driver from the relative positional relationship between the respective parts. Furthermore, attentiveness state detector 12 detects, from the images obtained by a near-infrared camera capturing the face of the driver, a pupil and a corneal reflex of the driver by performing image recognition processing, and detects the line of sight direction from the positional relationship of the pupil and corneal reflex detected. Furthermore, attentiveness state detector 12 also detects the frequency (number of times) and speed at which the eyes of the driver blink. Attentiveness state detector 12 for example successively detects, from the images, the driver's face orientation, line of sight direction, and blinking frequency and speed.

Attentiveness state detector 12 further detects the inattentive state of the driver, as the state of the driver, based on the detected face orientation, line of sight direction, and eye blinking frequency and speed of the driver. The inattentive state is said to be a state of inattentiveness due to driving being too easy, but can also be a state in which the driver is not paying attention to the driving of vehicle 2. Therefore, the inattentive state includes, for example, states of distraction, such as when the degree of awareness of the driver is equal to or less than a specified value, when the driver is not paying attention to the front, when the driver is thinking of something other than driving, and so on.

Specifically, attentiveness state detector 12 detects the degree of awareness of the driver for example based on the eye blinking frequency and speed. When the detected degree of awareness is equal to or less than the specified value, because drowsiness is setting in on the driver for example, attentiveness state detector 12 detects this state as an inattentive state. In this case, attentiveness state detector 12 outputs, to controller 20, inattentive state information indicating that the driver is in the inattentive state detected.

Furthermore, attentiveness state detector 12 detects as a state in which the driver is not paying attention to the front, a case in which the face orientation of the driver is not toward the front of vehicle 2 or a state in which the line of sight of the driver is not directed to the front of vehicle 2, based on the face orientation and line of sight direction of the driver. For this reason, attentiveness state detector 12 detects the above-described cases as an inattentive state. In these case too, attentiveness state detector 12 outputs, to controller 20, inattentive state information indicating that the driver is in the inattentive state detected.

Furthermore, attentiveness state detector 12 also detects an attentive state. The attentive state is the state in which the driver is paying attention. For example, the attentive state includes the state in which the driver is in a state of awareness as in the case where the degree of awareness of the driver is greater than the specified value, the state in which the driver is looking to the front of vehicle 2, and the like. Furthermore, attentiveness state detector 12 also detects whether driving is too easy, as part of the attentive state. To what degree driving is too easy can be evaluated using for example a driving score. Specifically, attentiveness state detector 12 evaluates sudden acceleration/deceleration and sudden turning of the steering wheel based on operating information of the accelerator, brake, and steering wheel, and vehicle speed information, from vehicle 2. Attentiveness state detector 12 calculates the driving score to be higher when acceleration/deceleration speed and steering wheel operating speed are within a specified reference. In addition, attentiveness state detector 12 may apply navigation information, and calculate the driving score to be higher when the steering wheel is operated at an appropriate spot (place). Accordingly, if the driving score is higher than a specified score, attentiveness state detector 12 detects that driving is too easy. Consequently, attentiveness state detector 12 detects an attentive state which includes the degree to which driving is too easy, and thereby detects the inattentive state of the driver.

Specifically, for example, when the driver's face orientation is toward the front of vehicle 2 and the line of sight direction is directed to the front of vehicle 2 based on the face orientation and line of sight direction of the driver, the driver is paying attention to the front, and thus attentiveness state detector 12 detects the attentive state. In these cases, attentiveness state detector 12 outputs, to controller 20, attentive state information indicating that the driver is in the attentive state detected.

It should be noted that the image analysis and the attentive state detection by attentiveness state detector 12 are not limited to the above, and the attentive state may be determined by artificial intelligence (AI) without defining what to focus on inside the images, for example.

[Controller 20]

When controller 20 obtains inattentive state information from attentiveness state detecting device 10, controller 20 causes at least part of the driving assistance functions to be reduced or deactivated by controlling driving assister 30 based on the obtained inattentive state information. Specifically, controller 20 extracts at least part of the driving assistance functions according to the inattentive state indicated in the inattentive state information, and outputs a control instruction for reducing or deactivating a driving assistance function extracted, to driving assister 30. The driving assistance functions that are reduced or deactivated by controller 20 are driving assistance functions that can be visibly, audibly, or tactilely perceived by the driver. The driving assistance functions that the driver can visibly perceive include the augmented reality display function for displaying by AR display device 3a, the brightness adjustment function for the light being emitted by headlamps 3b, the optical reflectance adjustment function for anti-glare mirror 3c, and the display function for the information related to driving assistance displayed on side mirrors 3d. A driving assistance function that can be audibly perceived by the driver is the output of sound by an acoustic system. A driving assistance function that can be tactilely perceived by the driver is the adjustment function for the amount of power assist provided by power steering 3e. Furthermore, although automatic breaking, lane keeping assist, electronic stability control, anti-lock braking system, and so on, are referred to as driving assistance functions, in this embodiment, controller 20 does not reduce or deactivate driving assistance functions that affect safety, even when the driver is in the inattentive state.

For example, when the degree of awareness is equal to or less than the specified value as the inattentive state, controller 20 may increase driving assistance functions to be reduced or deactivated on a predetermined period interval basis, or the driving assistance function to be reduced or deactivated is sequentially switched with among different driving assistance functions, until the driver becomes aware. In this manner, the number and sequence of the functions to be reduced or deactivated may be arbitrarily set. In particular, since AR display device 3a is highly visible to the driver, controller 20 may preferentially deactivate the augmented reality display that is being displayed by AR display device 3a.

Furthermore, controller 20 causes presenter 3f to output a message such as, for example, "XX function turned OFF", by outputting information indicating the reduced or deactivated driving assistance function to presenter 3f. Furthermore, each time controller 20 reduces or deactivates a driving assistance function when increasing the functions to be reduced or deactivated and when sequentially switching the function to be reduced or deactivated to a different driving assistance function, controller 20 outputs information indicating the reduced or deactivated driving assistance function to presenter 3f.

When controller 20 obtains attentive state information from attentiveness state detecting device 10, controller 20 determines whether at least part of the driving assistance functions is reduced or deactivated by driving assister 30. When at least part of the driving assistance functions is reduced or deactivated, controller 20, in order to restore the reduced or deactivated driving assistance function, outputs to driving assister 30 a restoration instruction to return the reduced or deactivated driving assistance function back to its previous state. Specifically, when controller 20 obtains attentive state information indicating that the driver is in the attentive state, controller 20 causes the reduced or deactivated driving assistance function to be restored by controlling driving assister 30 based on the attentive state information. Restoring the reduced or deactivated driving assistance function is returning the driving assistance function to the state prior to being reduced or deactivated.

Furthermore, controller 20 outputs information indicating the restored driving assistance function to presenter 3f.

Furthermore, controller 20 restores the reduced or deactivated driving assistance function when controller 20 obtains a restoration signal which is input by way of the driver operating operation input interface 40. Specifically, when controller 20 obtains the restoration signal, controller 20 outputs, to driving assister 30, a restoration instruction for restoring the driving assistance function according to the restoration signal.

[Driving Assister 30]

Driving assister 30 supports the driving by the driver of vehicle 2 through driving assistance functions, and reduces or deactivates driving assistance functions. Driving assister 30 reduces or deactivates a particular driving assistance function from among a plurality of driving assistance functions, based on the control instruction output by controller 20 according to the inattentive state indicated in inattentive state information. The driving assistance functions include the augmented reality display displayed by AR display device 3a, the brightness adjustment for the light being emitted by headlamps 3b, the optical reflectance adjustment for anti-glare mirror 3c, the display of information related to driving assistance displayed on side mirrors 3d, the adjustment of the amount of power assist provided by power steering 3e, and so on.

Driving assister 30 can change the brightness of light being emitted by headlamps 3b of vehicle 2. For example, when the light switch for headlamps 3b is in the "automatic" position, driving assister 30 automatically controls headlamps 3b according to the brightness of the surroundings of vehicle 2. The automatic control includes, for example, control for changing the brightness of the light being emitted by headlamps 3b, control for switching between turning on and turning off headlamps 3b, and control for changing the color tone of the light being emitted by headlamps 3b. Furthermore, as another specific control, since headlamps 3b in this embodiment are LEDs, driving assister 30 normally causes emission of light which is whiter and brighter than conventional halogen light. However, when the driver is in the inattentive state, driving assister 30 reduces the light emission by headlamps 3b to a brightness equivalent to that of halogen lights and also changes the color tone to a yellow tone. Accordingly, driving assister 30 notifies the driver of the inattentive state while maintaining legally-sufficient brightness for headlamps 3b.

When controller 20 obtains inattentive state information, driving assister 30 obtains a control instruction from control unit 20. Driving assister 30 reduces or deactivates the augmented reality display displayed by AR display device 3a, the brightness for the light being emitted by headlamps 3b, the optical reflectance of anti-glare mirror 3c, the display of information related to driving assistance displayed on side mirrors 3d, the amount of power assist provided by power steering 3e, and so on, of vehicle 2, according to the received control signal.

Specifically, when driving assister 30 obtains a control instruction based on inattentive state information, driving assister 30 deactivates the augmented reality display displayed by AR display device 3a of vehicle 2. Furthermore, when driving assister 30 obtains a control instruction based on inattentive state information, driving assister 30 reduces the brightness for the light being emitted by headlamps 3b of vehicle 2. Furthermore, driving assister 30 can change the optical reflectance of anti-glare mirror 3c of vehicle 2. For example, when anti-glare 3c is executing automatic anti-glare function, driving assister 30 automatically adjusts the optical reflectance of anti-glare mirror 3c according to the light incident on anti-glare mirror 3c. When driving assister 30 obtains a control instruction based on inattentive state information, driving assister 30 deactivates the automatic anti-glare function of anti-glare mirror 3c of vehicle 2. Furthermore, when driving assister 30 obtains a control instruction based on inattentive state information, driving assister 30 deactivates the display of information related to driving assistance displayed on side mirrors 3*d* of vehicle 2. Furthermore, when driving assister 30 obtains a control instruction based on inattentive state information, driving assister 30 reduces the amount of power assist or deactivates the power assist provided by power steering 3*e* of vehicle 2.

Furthermore, when controller obtains attentive state information, driving assister 30 obtains a restoration instruction from controller 20 according to an input (a restoration signal) from the driver who has operated operation input interface 40. Driving assister 30 restores the augmented reality display displayed by AR display device 3*a*, the brightness for the light being emitted by headlamps 3*b*, the optical reflectance of anti-glare mirror 3*c*, the display of information related to driving assistance displayed on side mirrors 3*d*, the amount of power assist provided by power steering 3*e*, and so on, of vehicle 2, according to the restoration instruction.

Furthermore, when driving assister 30 obtains a restoration instruction based on attentive state information, driving assister 30 causes augmented reality display on the display panel of AR display device 3*a*. Furthermore, when driving assister 30 obtains a restoration instruction based on attentive state information, driving assister 30 restores the brightness of light being emitted by headlamps 3*b* of vehicle 2 to the state before the driver fell into the inattentive state. When driving assister 30 obtains a restoration instruction based on attentive state information, driving assister 30 activates the automatic anti-glare function of anti-glare mirror 3*c* of vehicle 2. Furthermore, when driving assister 30 obtains a restoration instruction based on attentive state information, driving assister 30 causes side mirror 3*d* to display information related to driving assistance that is displayed on side mirrors 3*d*. Furthermore, when driving assister 30 obtains a restoration instruction based on attentive state information, driving assister 30 restores the amount of power assist provided by power steering 3*e* of vehicle 2.

[Operation Input Interface 40]

Operation input interface 40 is an input interface that receives input for operating AR display device 3*a*, headlamps 3*b*, anti-glare mirror 3*c*, side mirrors 3*d*, and power steering 3*e*, for example. Operation input interface 40 outputs an operation signal (including a restoration signal, for example) according to the operation input by the driver's operation, to controller 20. As illustrated in FIG. 2, operation input interface 40 may be a dedicated operation switch 41 provided in center console 3*i*, for example. Accordingly, since operation switch 41 cannot be operated without the driver releasing one hand from the steering wheel, operation switch 41 can further promote awareness of the driver by imposing a troublesome operation on the driver.

It should be noted that, operation switch 41 is not limited to being provided on the upper portion of central console 3*i* (for example, the center portion of the instrument panel where central registers or the like are provided, or the area from the central registers to the shift lever, or the like) as illustrated in FIG. 2, and may be provided in the vicinity of meter 3*h* (for example, in an area where the meter hood, meter cluster, side register, center register, or the like are provided, or in a portion of the instrument panel where meter 3*h* is disposed). In this manner, since the driver has to face the meter hood or the upper portion of center console 3*i* when operating operation switch 41, it is possible to prompt the driver to pay attention to the front. Accordingly, the driver's state of attention in the forward direction can be improved.

Furthermore, when operation input interface 40 receives an operation input by the driver for restoring the reduced or deactivated driving assistance function, operation input interface 40 outputs a restoration signal to controller 20. Accordingly, when a restoration instruction based on the restoration signal is output from controller 20 to driving assister 30, driving assister 30 restores the reduced or deactivated driving assistance function.

Figure 3:
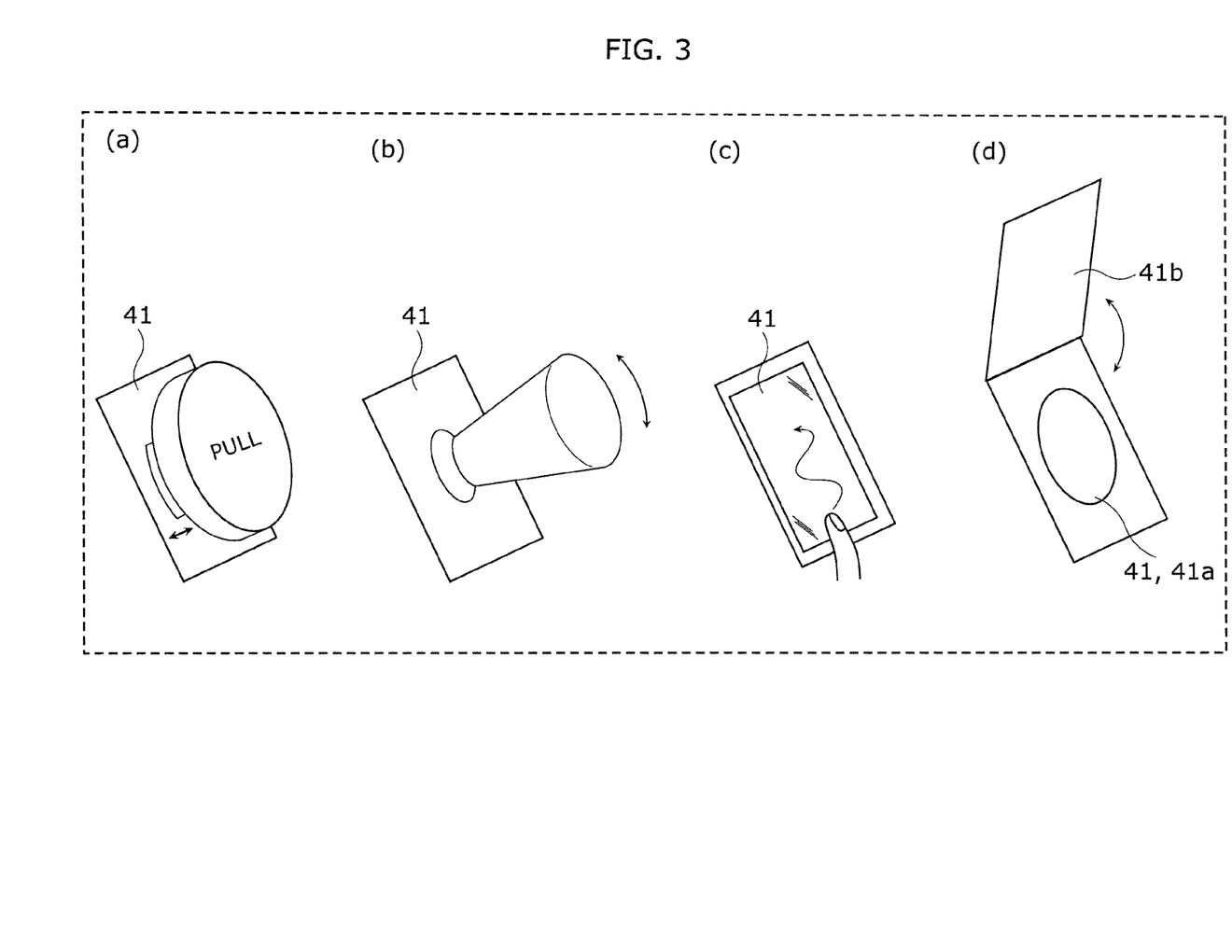
FIG. 3 is an outline diagram illustrating configurations of an operation switch of the driving assistance apparatus according to the embodiment, where (a) illustrates a pull switch, (b) illustrates a toggle switch, (c) illustrates a touch switch that receives touch-gesture input, and (d) illustrates a covered switch.

Next, specific examples of operation switch 41 included in operation input interface 40 will be described with reference to FIG. 3. FIG. 3 is an outline diagram illustrating configurations of operation switch 41 of driving assistance apparatus 1 according to this embodiment, where (a) illustrates a pull switch, (b) illustrates a toggle switch, (c) illustrates a touch switch that receives touch-gesture input, and (d) illustrates a covered switch.

Operation switch 41 may be a pull switch illustrated in (a) in FIG. 3 for example. By adopting a pull switch, the driver needs to perform a pulling operation on operation switch 41 in order to restore a driving assistance function. Since the direction of the operation is opposite to the direction of travel of vehicle 2, the operation is counter-instinctive (counterintuitive), and thus the driver needs to pay attention to the operation. In this manner, by purposely making it necessary to pay attention to the operation, the attention of the driver can returned to driving.

Furthermore, operation switch 41 may be a toggle switch illustrated in (b) in FIG. 3 for example. By adopting a toggle switch, the driver needs to perform an operation to move operation switch 41 upward or downward in order to restore a driving assistance function. Since this operation also requires an operation in a direction different from the direction of travel of vehicle 2, the operation is counter-instinctive, and thus the driver needs to pay attention to the operation. In this manner, by purposely making it necessary to pay attention to the operation, the attention of the driver can returned to driving. It should be noted that the direction of operation of the toggle switch is not limited to the up-down direction, and may be a left-right direction or a diagonal direction. Furthermore, the toggle switch may combine operations in a plurality of directions.

Furthermore, operation switch 41 may be a switch that is a combination of the pull switch in (a) in FIG. 3 and the toggle switch in (b) in FIG. 3. For example, operation switch 41 may have the shape in (b) in FIG. 3, but is moved upward while being pulled or moved downward while being pulled, in order to perform the operation to restore a driving assistance function. Inversely, operation switch 41 may be pulled while in the moved-upward or downward state.

Furthermore, operation switch 41 may be a touch switch that receives touch-gesture input, illustrated in (c) in FIG. 3 for example. It should be noted that a touch switch that receives touch-gesture input is defined as a switch that includes a touch sensor that senses touch-gesture inputs, and outputs an ON signal when a predetermined touch-gesture input is made on the touch sensor. By adopting such a touch switch, the driver needs to perform an operation of inputting a predetermined touch-gesture ((c) in FIG. 3 illustrates a zigzag touch-gesture as an example) to operation switch 41 in order to restore a driving assistance function. By making the touch-gesture that is not related to (completely different from) the direction of travel of vehicle 2 which advances linearly or in a curve, the operation is counter-instinctive, and thus the driver needs to pay attention to the operation. In this manner, by purposely making it necessary to pay attention to the operation, the attention of the driver can returned to driving.

Furthermore, operation switch 41 may be a covered switch illustrated in (d) in FIG. 3 for example. By adopting a covered switch, in order to restore a driving assistance function, the driver needs to perform the switch operation after flipping-up and opening cover 41*b* of operating switch 41. Since the operation of opening cover 41*b* is also in a direction different to the direction of travel of vehicle 2, the operation is counter-instinctive, and thus the driver needs to pay attention to the operation. In this manner, by purposely making it necessary to pay attention to the operation, the attention of the driver can returned to driving.

It should be noted that the covered switch illustrated in (d) in FIG. 3 may be combined with the respective switches illustrated in (a) to (c) in FIG. 3, for example. In this case, since the driver has to pay even more attention to the operation, it is further possible to return the attention of the driver to driving. Furthermore, a plurality of the respective switches illustrated in (a) to (c) in FIG. 3 may be a combined.

(Operation)

The operations performed by driving assistance apparatus 1 configured in the above-described manner will be described below.

Figure 4:
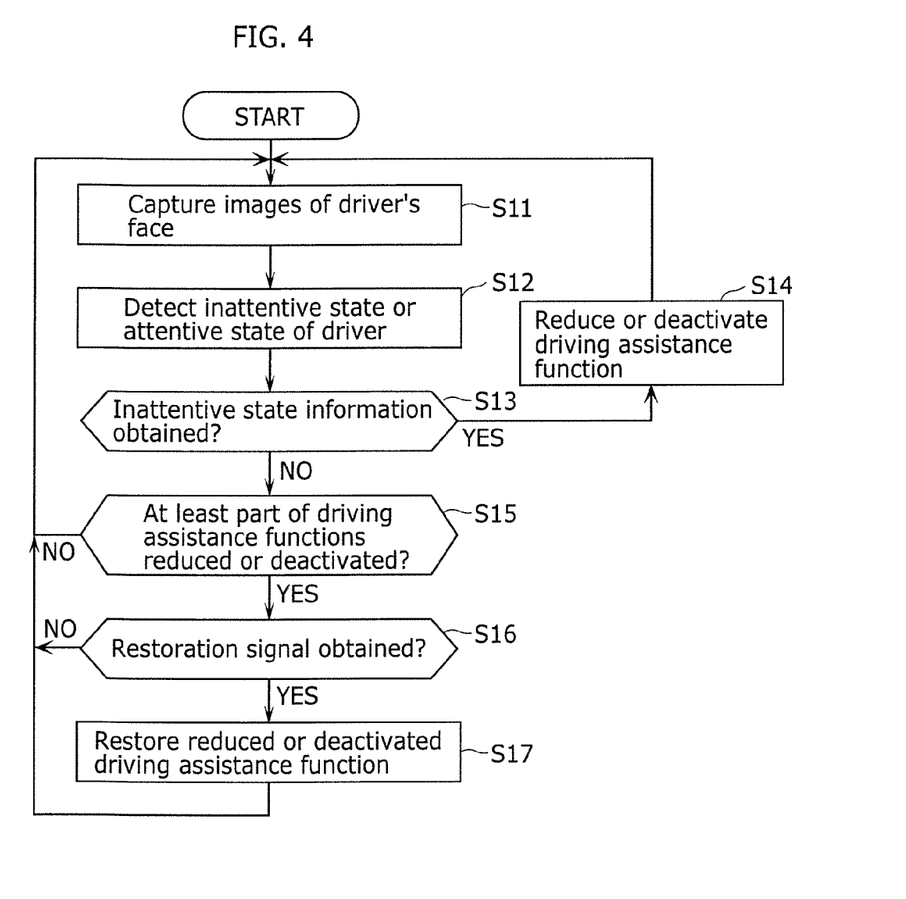
FIG. 4 is a flowchart of operation of the driving assistance apparatus according to the embodiment.

FIG. 4 is a flowchart of the operation of driving assistance apparatus 1 according to this embodiment.

Here, the case where all driving assistance functions are in the ON state is assumed.

First, as indicated in FIG. 4, imaging device 11 of attentiveness state detecting device 10 captures images of the face of a driver sitting in the driver's seat (S11).

Next, attentiveness state detector 12 of attentiveness state detecting device 10 detects the face orientation, line of sight direction, and the eye blinking frequency and speed of the driver based on the images captured by image capturing device 11. Then, attentiveness state detector 12 of attentiveness state detecting device 10 detects the state of the driver, based on the detected face orientation, the line of sight direction, and the eye blinking frequency and speed of the driver. Specifically, attentiveness state detector 12 detects an inattentive state or attentive state of the driver (S12).

Attentiveness state detector 12 detects the inattentive state when the degree of awareness of the driver detected based on the eye blinking frequency and speed is less than or equal to a specified value. Furthermore, attentiveness state detector 12 detects the inattentive state when the face orientation of the driver is not toward the front of vehicle 2 or when the line of sight of the driver is not directed to the front of vehicle 2, based on the face orientation and line of sight direction of the driver. In these cases, attentiveness state detector 12 outputs inattentive state information to controller 20.

Furthermore, attentiveness state detector 12 detect the attentive state when the degree of awareness of the driver detected based on the eye blinking frequency and speed is greater than the specified value, and the face orientation of the driver is toward the front of vehicle 2 and the line of sight of the driver is directed to the front of vehicle 2 based on the face orientation and line of sight direction of the driver. In these cases, attentiveness state detector 12 outputs attentive state information to controller 20.

Controller 20 determines whether inattentive state information has been obtained from attentiveness state detecting device 10 (S13).

When controller 20 obtains inattentive state information (YES in S13), controller 20 outputs a control instruction for causing driving assister 30 to reduce or deactivate at least part of the driving assistance functions, to driving assister 30. When driving assister 30 obtains the control instruction from controller 20, driving assister 30 reduces or deactivates a driving assistance function according to the obtained control instruction (S14). Specifically, driving assister 30 controls at least one of AR display device 3*a*, headlamps 3*b*, anti-glare mirror 3*c*, side mirrors 3*d*, and power steering 3*e*, based on the control instruction. Then, controller 20 returns the process to step S11, and repeats the same process.

When controller 20 receives attentive state information (NO in S13), controller 20 determines whether driving assister 30 has reduced or deactivated at least part of the driving assistance functions (S15).

When driving assister 30 has reduced or deactivated at least part of the driving assistance functions (YES in S15), controller 20 determines whether a restoration signal has been obtained from operation input interface 40 for restoring the reduced or deactivated driving assistance function (S16).

When controller 20 determines that a restoration signal has been obtained (YES in S16), controller 20 outputs, to driver assister 30, a control signal according to the restoration signal in order to restore the reduced or deactivated driving assistance function. When driving assister 30 obtains the control signal, driving assister 30 restores the reduced or deactivated driving assistance function (S17). Then, controller 20 returns the process to step S11, and repeats the same process.

When driving assister 30 has not reduced or deactivated at least part of the driving assistance functions (NO in S15) or if controller 20 determines that a control signal is not obtained (NO in S16), controller 20 returns the process to step S11 and repeats the same process.

(Effects)

Next, the effects of driving assistance apparatus 1 in this embodiment will be described.

As described above, driving assistance apparatus 1 according to this embodiment includes: driving assister 30 that assists driving by a driver of vehicle 2, by way of driving assistance functions; and controller 20 that obtains inattentive state information indicating an inattentive state of the driver, and reduces or deactivates at least one driving assistance function among the driving assistance functions, by controlling driving assister 30 based on the inattentive state information obtained.

Accordingly, if the driver of vehicle 2 falls into the inattentive state, controller 20 can control driving assister 30 to cause driving assister 30 to reduce or deactivate at least part of the driving assistance functions. As such, driving assistance apparatus 1 can prevent the state in which the driving skill of the driver is higher than the driving difficulty. Furthermore, driving assistance apparatus 1 can make the driver aware of his/her inattentive state by causing a change in the driving assistance functions. As such, driving assistance apparatus 1 can influence the consciousness of the driver so that the driver drives attentively.

Therefore, driving assistance apparatus 1 can ameliorate the inattentive state of the driver.

Furthermore, driving assistance apparatus 1 according to this embodiment further includes attentiveness state detector 12 that detects the inattentive state of the driver, and outputs the inattentive state information indicating the inattentive state detected. In addition, attentiveness state detector 12 distinguishes between an attentive state in which the driver is paying attention and the inattentive state in which the driver is not paying attention.

Accordingly, it is possible to determine whether the driver is in the attentive state or the inattentive state. Since the driver can be assisted using the driving assistance functions if the driver is in the attentive state, it is possible to ensure safety during traveling of vehicle 2. Furthermore, if the driver is in the inattentive state, driving assister 30 reduces or deactivates at least part of the driving assistance functions, and thus it is possible to influence the consciousness of the driver so that the driver drives attentively as described above.

Furthermore, in driving assistance apparatus 1 according to this embodiment, attentiveness state detector 12 detects, as the inattentive state, a state in which a degree of awareness of the driver is less than or equal to a specified value or a state in which the driver is not paying attention to a front of the vehicle.

Accordingly, since the inattentive state of the driver can be detected, the state of the driver with regard to attentiveness can be improved.

Furthermore, in driving assistance apparatus 1 according to this embodiment, when controller 20 obtains the inattentive state information, driving assister 30 deactivates augmented reality (AR) display by AR display device 3a of vehicle 2.

Accordingly, reducing the brightness of the light being emitted by headlamps 3b causes the driver to pay attention to the front. As such, driving assistance apparatus 1 can influence the consciousness of the driver so that the driver drives attentively as described above.

Furthermore, in driving assistance apparatus 1 according to this embodiment, when controller 20 obtains the inattentive state information, driving assister 30 reduces the brightness of light being emitted by headlamps 3b of vehicle 2.

Accordingly, by deactivating the automatic anti-glare function of anti-glare mirror 3c, anti-glare mirror 3c will be glaring to be driver. As such, driving assistance apparatus 1 can influence the consciousness of the driver so that the driver drives attentively as described above.

Furthermore, in driving assistance apparatus 1 according to this embodiment, when controller 20 obtains the inattentive state information, driving assister 30 deactivates the automatic anti-glare function of anti-glare mirror 3c of vehicle 2.

Accordingly, deactivating the display of information related to driving assistance that is displayed on side mirrors 3d causes the driver to pay attention to the surroundings of vehicle 2. As such, driving assistance apparatus 1 can influence the consciousness of the driver so that the driver drives attentively as described above.

Furthermore, in driving assistance apparatus 1 according to this embodiment, when controller 20 obtains the inattentive state information, driving assister 30 deactivates display of information related to driving assistance displayed on side mirrors 3d of vehicle 2.

Accordingly, deactivating the augmented reality display by AR display device 3a causes the driver to pay attention to the front. As such, driving assistance apparatus 1 can influence the consciousness of the driver so that the driver drives attentively as described above.

Furthermore, in driving assistance apparatus 1 according to this embodiment, when controller 20 obtains the inattentive state information, driving assister 30 reduces the amount of power assist or deactivates the power assist provided by power steering 3e of vehicle 2.

Accordingly, reducing the amount of power assist or deactivating the power assist provided by power steering 3e causes the driver to operate the handle while paying attention to the surroundings of vehicle 2. As such, driving assistance apparatus 1 can influence the consciousness of the driver so that the driver drives attentively as described above.

Furthermore, driving assistance apparatus 1 according to this embodiment further includes presenter 3f that presents the at least one driving assistance function that has been reduced or deactivated by driving assister 30.

Accordingly, since driving assister 30 presents the reduced or deactivated driving assistance function, the driver can be made aware of his/her inattentive state. As such, driving assistance apparatus 1 can influence the consciousness of the driver so that the driver drives attentively. As such, the driver can take a response such as restoring the driving assistance function.

Furthermore, in driving assistance apparatus 1 according to this embodiment, when controller 20 obtains a restoration signal input through operation of operation input interface 40 by the driver, for restoring the at least one driving assistance function that has been reduced or deactivated, controller 20 restores the at least one driving assistance function that has been reduced or deactivated.

Accordingly, since the driver can become aware of his/her inattentive state, the driver operates operation input interface 40 to restore the reduced or deactivated driving assistance function. As such, the driver can strive to stay in the attentive state so as not to be troubled by having to operate operation input interface 40.

Furthermore, in driving assistance apparatus 1 according to this embodiment, operation input interface 40 includes operation switch 41 provided in a vicinity of meter 3h or at an upper portion of center console 3i of vehicle 2.

Accordingly, since operation switch 41 for restoring the driving assistance functions is disposed at a position that prompts the driver to pay attention to the front, the driver can pay attention to the front of the vehicle while operating operation input interface 40. With driving assistance apparatus 1, the driver's state of attention in the forward direction can be improved.

Furthermore, in driving assistance apparatus 1 according to this embodiment, operation switch 41 is any one of a pull switch, a toggle switch, and a touch switch that receives touch-gesture input.

Accordingly, the driver needs to perform a pulling operation, a vertical motion operation, or a touch-gesture input operation on operation switch 41 in order to restore the driving assistance function. Since above-described operation switch 41 is configured so that operation by the driver requires attentiveness, it is possible to return the driver's attention to driving.

Furthermore, in driving assistance apparatus 1 according to this embodiment, operation switch 41 of operation input interface 40 includes cover 41b that covers operation portion 41a.

Accordingly, the driver cannot perform switch operation on operation switch 41 in order to restore the driving assistance functions without first opening cover 41b. As such, with this configuration, operation by the driver also requires attentiveness, and thus it is possible to return the driver's attention to driving.

Variation of Embodiment (Configuration)

Driving assistance apparatus 1 according to this variation will be described.

This variation is different from the foregoing embodiment in that, when the driver returns to the attentive state after driving assistance apparatus 1 reduces or deactivates at least part of the driving assistance functions, driving assistance apparatus 1 automatically restores the reduced or deactivated driving assistance function. Unless described otherwise, the other elements in this variation are the same as in the foregoing embodiment, and thus the same reference signs are given and detailed description regarding their configuration is omitted.

Attentiveness state detector 12 detects the attentive state and inattentive state of the driver. Attentiveness state detector 12 detects the attentive state or inattentive state on a predetermined period interval basis.

When controller 20 obtains attentive state information from attentiveness state detector 12, controller 20 automatically restores the reduced or deactivated driving assistance function by controlling driving assister 30 based on the obtained attentiveness state information. Specifically, when controller 20 obtains attentive state information, controller 20, in order to restore the reduced or deactivated driving assistance function, automatically outputs a restoration instruction to driving assister 30 to return the reduced or deactivated driving assistance function back to its previous state.

Furthermore, when driving assister 30 obtains a restoration instruction based on attentive state information, driving assister 30 controls AR display device 3a, headlamps 3b, anti-glare mirror 3c, side mirrors 3d, and power steering 3e in order to restore the reduced or deactivated driving assistance function.

(Operation)

The operations performed by driving assistance device 1 configured in the above-described manner will be described below.

Figure 5:
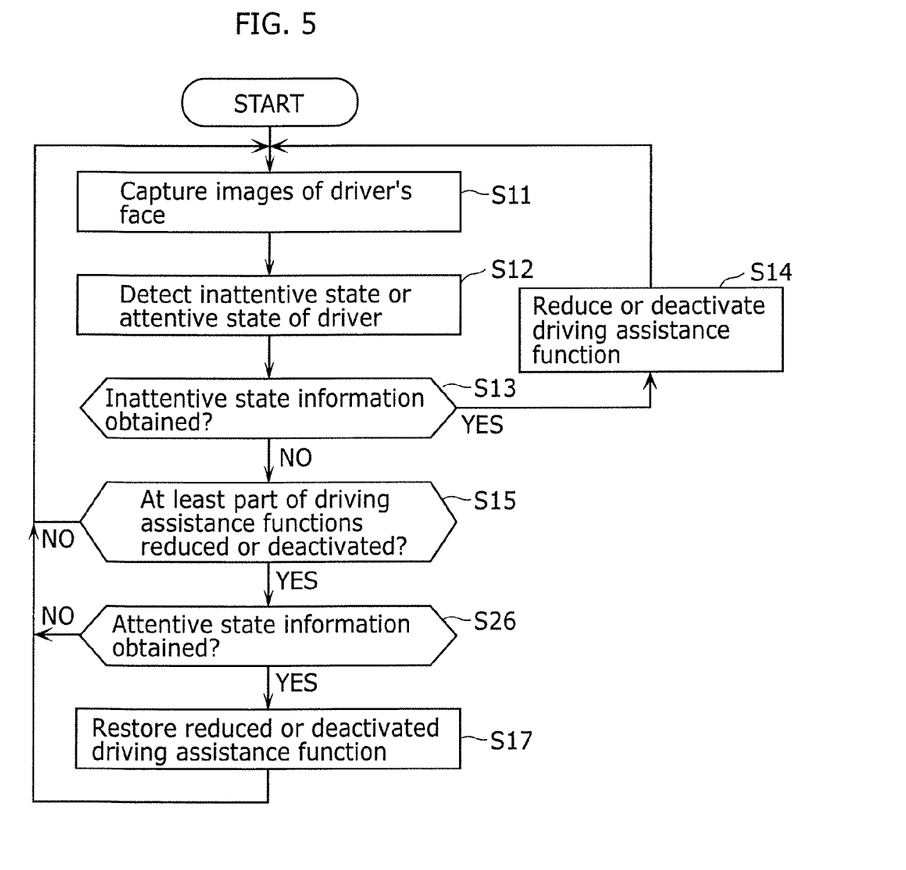
FIG. 5 is a flowchart of operation of a driving assistance apparatus according to a variation of the embodiment.

FIG. 5 is a flowchart of the operation of driving assistance apparatus 1 according to this variation of the embodiment. With regard to the operation performed by driving assistance apparatus 1, processes that are the same as those in FIG. 4 will be given the same reference signs and description is omitted as appropriate.

When driving assister 30 has reduced or deactivated at least part of the driving assistance functions (YES in S15) after going through the processes from steps S11 to S15, controller 20 determines whether attentive state information has been received from attentiveness state detector 12 (S26).

When controller 20 obtains attentive state information from attentiveness state detector 12 (YES in S26), controller 20 outputs a restoration instruction for restoring the reduced or deactivated driving assistance function, to driving assister 30. When driving assister 30 obtains the restoration instruction, driving assister 30 restores the reduced or deactivated driving assistance function (S17). Then, controller 20 returns the process to step S11, and repeats the same process.

Furthermore, when controller 20 obtains inattentive state information from attentiveness state detector 12 (NO in S26), controller 20 returns the process to step S11 and repeats the same process.

(Effects)

In driving assistance apparatus 1 in this variation, attentiveness state detector 12 detects the attentive state of the driver. Then, controller 20 restores the reduced or deactivated driving assistance function by controlling driving assister 30 based on attentive state information indicating the attentive state of the driver obtained from attentiveness state detector 12.

With this, when the driver returns from the inattentive state to the attentive state, controller 20 can restore the reduced or deactivated driving assistance function by controlling driving assister 30. Accordingly, since the reduced or deactivated driving assistance function is restored, the driver can drive vehicle 2 more safely.

This variation produces the same effects as the above-described embodiment.

Other Variations and so on

Although the present disclosure has been described based on the foregoing exemplary embodiment and a variation thereof, the present discloser is not limited to the foregoing embodiment and the variation thereof.

For example, in the driving assistance apparatus in the above-described embodiment and the variation thereof, the controller may have a table for reducing or deactivating driving assistance functions corresponding to the inattentive state of the driver. The controller may determine the driving assistance function to reduce or deactivate by referring to the table. Specifically, may quantify the inattentive state of the driver, and determine the driving assistance function to reduce or deactivate from among the driving assistance functions, according to the magnitude of the quantified inattentive state. For example, as the magnitude of the value of the inattentive state increases, the controller may increase the number of driving assistance functions to reduce or deactivate. Furthermore, for example, in the inattentive state of the driver, when the degree of awareness is less than or equal to a specified value, the controller may increase the number of driving assistance functions to reduce or deactivate as the degree of awareness is lower.

Furthermore, the driving assistance apparatus according to the foregoing embodiment and the variation thereof may be implemented by a program that uses a computer, and such a program may be recorded on a recording device.

Furthermore, the respective processing units included in the driving assistance apparatus according to the foregoing embodiment and the variation thereof may be implemented typically as large-scale integration (LSI) which is an integrated circuit. These processing units may be implemented as individual chips, or as a single chip to include all or a part thereof.

Furthermore, the circuit integration is not limited to an LSI, and may be implemented by a dedicated circuit or general-purpose processor. A field programmable gate array (FPGA) that allows for programming after the manufacture of an LSI, or a reconfigurable processor that allows for reconfiguration of the connection and the setting of circuit cells inside an LSI may be employed.

It should be noted that, in the foregoing embodiment and the variation thereof, the respective structural components may be configured using dedicated hardware or may be realized by executing a software program suitable for the respective components. Each of the structural components may be implemented by a program executing component, such as a CPU or processor, reading and executing a software program recorded on a recording medium such as a hard disc or a semiconductor memory.

The numerals used in the foregoing description are all examples for specifically describing the present disclosure, and the exemplary embodiment of the present invention and the variation of the embodiment are not limited to the numerals given as examples.

Furthermore, the divisions of the functional blocks illustrated in the block diagrams are mere examples, and thus a plurality of functional blocks may be implemented as a single functional block, or a single functional block may be divided into a plurality of functional blocks, or part of the functions may be moved to another functional block. Furthermore, the functions of a plurality of functional blocks having similar functions may be processed by single hardware or software in a parallel or time-divided manner.

Furthermore, the order of executing the steps shown in the flowcharts is a mere illustration for specifically describing the present disclosure, and thus may be an order other than the shown order. Furthermore, part of the steps may be executed simultaneously (in parallel) with another step.

The present disclosure encompasses forms that can be obtained by various modifications to the exemplary embodiment and variation thereof that may be conceived by a person of skill in the art as well as forms realized by arbitrarily combining structural components in the foregoing embodiment and variation thereof without departing from the spirit of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: Japanese Patent Application No. 2019-230726 filed on Dec. 20, 2019 and Japanese Patent Application No. 2020-110531 filed on Jun. 26, 2020.

INDUSTRIAL APPLICABILITY

The present disclosure can be applied to an autonomously-driven vehicle and a manually-driven vehicle.

The invention claimed is:

1. A driving assistance apparatus, comprising:
  a driving assister that assists driving by a driver of a vehicle, by way of driving assistance functions;
  a controller that obtains inattentive state information indicating an inattentive state of the driver, and reduces or deactivates at least one driving assistance function among the driving assistance functions, by controlling the driving assister based on the inattentive state information obtained; and
  an attentiveness state detector that detects the inattentive state of the driver, and outputs the inattentive state information indicating the inattentive state detected,
  wherein, when the attentiveness state detector distinguishes between an attentive state in which the driver is paying attention and the inattentive state in which the driver is not paying attention, the attentiveness state detector detects, as the inattentive state, a state in which a degree of awareness of the driver is less than or equal to a specified value or a state in which the driver is not paying attention to a front of the vehicle,
  the driving assistance functions include at least one highly visible driving assistance function which is highly visible to the driver and other driving assistance functions different from the at least one highly visible driving assistance function, and
  when the degree of awareness is less than or equal to the specified value as the inattentive state, the controller reduces or deactivates the at least one highly visible driving assistance function first, and after controlling the highly visible driving support function, the controller reduces or deactivates a greater number of the other driving assistance functions as the degree of awareness is lower.

2. The driving assistance apparatus according to claim 1, wherein, after the controller reduces or deactivates the at least one highly visible driving assistance function, the controller reduces or deactivates the greater number of the other driving assistance functions on a predetermined period interval basis until the driver becomes aware.

3. The driving assistance apparatus according to claim 1, wherein the controller includes a function for arbitrarily setting a sequence of the other driving assistance functions to reduce or deactivate after the controller reduces or deactivates the at least one highly visible driving assistance function.

4. The driving assistance apparatus according to claim 1, wherein the at least one highly visible driving assistance function includes at least one of an augmented reality (AR) display by an AR display device of the vehicle or a function for adjusting brightness of light being emitted by a headlamp of the vehicle.

5. The driving assistance apparatus according to claim 1, wherein, when the controller obtains the inattentive state information, the driving assister deactivates an automatic anti-glare function of an anti-glare mirror of the vehicle.

6. The driving assistance apparatus according to claim 1, wherein, when the controller obtains the inattentive state information, the driving assister deactivates display of information related to driving assistance displayed on a side mirror of the vehicle.

7. The driving assistance apparatus according to claim 1, wherein, when the controller obtains the inattentive state information, the driving assister reduces an amount of power assist or deactivates the power assist provided by a power steering of the vehicle.

8. The driving assistance apparatus according to claim 1, further comprising:
  a presenter that presents the at least one driving assistance function that has been reduced or deactivated by the controller.

9. The driving assistance apparatus according to claim 1, wherein, when the controller obtains a restoration signal input through operation of an operation input interface by the driver, for restoring the at least one driving assistance function that has been reduced or deactivated, the controller restores the at least one driving assistance function that has been reduced or deactivated.

10. The driving assistance apparatus according to claim 9, wherein the operation input interface includes an operation switch provided in a vicinity of a meter of the vehicle or at an upper portion of a center console of the vehicle.

11. The driving assistance apparatus according to claim 10, wherein the operation switch is any one of a pull switch, a toggle switch, or a touch switch that receives touch-gesture input.

12. The driving assistance apparatus according to claim 10, wherein the operation switch includes a cover that covers an operation portion of the operation switch.

13. The driving assistance apparatus according to claim 1, wherein the attentiveness state detector detects the attentive state of the driver, and
  the controller restores the at least one driving assistance function that has been reduced or deactivated, by controlling the driving assister based on attentive state information obtained from the attentiveness state detector and indicating the attentive state of the driver.

\* \* \* \* \*